(12) United States Patent
Shores et al.

(10) Patent No.: US 10,928,742 B2
(45) Date of Patent: Feb. 23, 2021

(54) ADDITIVE MANUFACTURING SYSTEMS AND METHODS FOR NON-PLANAR INTERFACES BETWEEN LAYERS

(71) Applicant: 3DFortify, Inc., Boston, MA (US)

(72) Inventors: Daniel T. Shores, Georgetown, MA (US); Joshua J. Martin, Arlington, MA (US); Randall M. Erb, Newton, MA (US)

(73) Assignee: 3DFortify, Inc., Boston, MA (US)

( * ) Notice: Subject to any disclaimer, the term of this patent is extended or adjusted under 35 U.S.C. 154(b) by 0 days.

(21) Appl. No.: 16/912,188

(22) Filed: Jun. 25, 2020

(65) Prior Publication Data

US 2020/0326639 A1    Oct. 15, 2020

Related U.S. Application Data

(63) Continuation of application No. 16/531,932, filed on Aug. 5, 2019, now Pat. No. 10,732,521.

(Continued)

(51) Int. Cl.
  *G03F 9/00* (2006.01)
  *G02F 1/11* (2006.01)
  *B29C 64/188* (2017.01)

(52) U.S. Cl.
  CPC .......... *G03F 9/7007* (2013.01); *B29C 64/188* (2017.08); *G02F 1/116* (2013.01)

(58) Field of Classification Search
  CPC . G03F 9/7007; G03F 7/70416; B29C 64/188; B29C 64/386; G02F 1/116;

(Continued)

(56) References Cited

U.S. PATENT DOCUMENTS

| 5,999,184 A | * | 12/1999 | Smalley | G06T 17/00 |
| | | | | 345/419 |
| 6,193,923 B1 | * | 2/2001 | Leyden | B33Y 30/00 |
| | | | | 264/401 |

(Continued)

FOREIGN PATENT DOCUMENTS

WO    WO-2015/188175 A1    12/2015

OTHER PUBLICATIONS

U.S. Appl. No. 16/531,932, filed Aug. 5, 2019, Daniel T. Shores et al.

(Continued)

*Primary Examiner* — Ramesh B Patel
(74) *Attorney, Agent, or Firm* — Goodwin Procter LLP

(57) ABSTRACT

Three-dimensional printing methods and systems use a derived geometry and aligns anisotropic inclusions in any orientation at any number of discrete volumetric sections. Structural, thermal, or geometry-based analyses are combined with inclusion alignment computations and print preparation methods and provided to 3D printers to produce composite material parts that meet demanding geometric needs as well as enhanced structural and thermal requirements. In one example, optimal inclusion alignment vectors associated with a section of the object are calculated based on specifications for the object, segmenting a three-dimensional model of the object into layer slices, grouping each section within each layer slice having similar alignment vectors and combining the groupings and generating printing instructions for the object according to the grouped alignment vectors.

24 Claims, 6 Drawing Sheets

Related U.S. Application Data

(60) Provisional application No. 62/715,379, filed on Aug. 7, 2018.

(58) Field of Classification Search
CPC .. G06F 2119/14; G06F 2113/10; G06F 30/23; Y02P 10/25; B33Y 70/10; B33Y 50/00; B33Y 10/00; B22F 3/008; B22F 2003/1057; B22F 3/1055
See application file for complete search history.

(56) References Cited

U.S. PATENT DOCUMENTS

| | | | |
|---|---|---|---|
| 6,333,741 B1* | 12/2001 | Snead | B29C 64/393 |
| | | | 345/423 |
| 8,889,761 B2 | 11/2014 | Studart et al. | |
| 9,198,733 B2* | 12/2015 | Neal, II | A61B 34/10 |
| 10,073,424 B2 | 9/2018 | Lin et al. | |
| 10,254,499 B1* | 4/2019 | Cohen | H01R 4/022 |
| 10,732,521 B2* | 8/2020 | Shores | G03F 9/7007 |
| 2005/0060130 A1* | 3/2005 | Shapiro | G06F 30/23 |
| | | | 703/2 |
| 2011/0142316 A1* | 6/2011 | Wang | G06T 11/006 |
| | | | 382/131 |
| 2013/0053471 A1* | 2/2013 | Studart | C08J 5/24 |
| | | | 523/115 |
| 2013/0056672 A1* | 3/2013 | Johnston | B33Y 10/00 |
| | | | 252/62.54 |
| 2014/0052285 A1* | 2/2014 | Butcher | G05B 19/0426 |
| | | | 700/98 |
| 2014/0291886 A1* | 10/2014 | Mark | B29C 69/001 |
| | | | 264/163 |
| 2015/0045928 A1* | 2/2015 | Perez | B29C 48/02 |
| | | | 700/110 |
| 2015/0251360 A1* | 9/2015 | Steele | B33Y 50/02 |
| | | | 264/308 |
| 2015/0266235 A1* | 9/2015 | Page | B29C 64/393 |
| | | | 264/245 |
| 2016/0067928 A1* | 3/2016 | Mark | B33Y 10/00 |
| | | | 264/401 |
| 2016/0096318 A1* | 4/2016 | Bickel | B33Y 10/00 |
| | | | 264/40.1 |
| 2016/0193785 A1* | 7/2016 | Bell | B29C 64/118 |
| | | | 264/255 |
| 2017/0050382 A1 | 2/2017 | Minardi et al. | |
| 2017/0136699 A1* | 5/2017 | Erb | B29C 64/165 |
| 2017/0136708 A1* | 5/2017 | Das | B29C 35/0805 |
| 2017/0173695 A1* | 6/2017 | Myerberg | B33Y 30/00 |
| 2017/0239719 A1* | 8/2017 | Buller | B23K 26/032 |
| 2017/0304944 A1* | 10/2017 | Symeonidis | B33Y 10/00 |
| 2017/0334136 A1 | 11/2017 | Mark et al. | |
| 2018/0207863 A1 | 7/2018 | Porter et al. | |
| 2019/0009472 A1* | 1/2019 | Mark | G05B 19/4099 |
| 2019/0054700 A1* | 2/2019 | Chandar | B33Y 50/02 |
| 2019/0072933 A1* | 3/2019 | Wu | B33Y 50/02 |
| 2019/0102815 A1* | 4/2019 | Norman | G06Q 30/06 |
| 2019/0263060 A1* | 8/2019 | Goodrich | B33Y 50/02 |
| 2019/0339671 A1* | 11/2019 | Yona | B33Y 50/00 |
| 2020/0096970 A1* | 3/2020 | Mehr | G05B 19/4099 |

OTHER PUBLICATIONS

International Search Report and Written Opinion of the International Searching Authority for International Application No. PCT/US2019/045322 dated Oct. 25, 2019 (17 pages).

Kokkinis, et al., "Multimaterial Magnetically Assisted 3D Printing of Composite Materials", pp. 1-10, Jul. 2015.

* cited by examiner

ADDITIVE MANUFACTURING SYSTEMS AND METHODS FOR NON-PLANAR INTERFACES BETWEEN LAYERS

CROSS-REFERENCE TO RELATED APPLICATIONS

This application is a continuation of U.S. patent application Ser. No. 16/531,932, filed on Aug. 5, 2019, entitled "Systems and Methods for Alignment of Anisotropic Inclusions in Additive Manufacturing Processes" now issued as U.S. Pat. No. 10,732,521, which claims priority to, and the benefit of U.S. provisional patent application Ser. No. 62/715,379, entitled "Systems and Methods for Alignment of Anisotropic Inclusions in Additive Manufacturing Processes" filed on Aug. 7, 2018, the entire disclosures of which are both incorporated by reference herein.

FIELD OF THE INVENTION

The invention relates generally to additive manufacturing processes, and, more particularly, techniques and supporting systems for the arrangement and alignment of anisotropic inclusions during the production process.

BACKGROUND OF THE INVENTION

Additive manufacturing processes (referred to here as three-dimensional printing, or "3D printing") are used to prototype and fabricate complex three-dimensional objects out of a variety of materials, including polymers, metals and ceramics. These techniques have been used to manufacture objects that can withstand heavy loads and forces such as automotive parts, aeronautical components, and other industrial parts at accuracies down to tens of microns.

Conventional approaches to 3D printing use extrusion-based direct-write methods for thermoplastics and stereolithography (SLA) based photo-polymerization for both thermoplastics and thermosets. However, such techniques often result in printed polymers that are lightweight but relatively weak.

More recent implementations utilize fiber-reinforced polymer composites and automated fiber placement printers to print continuous carbon fiber, Kevlar, and fiberglass reinforced polymer. However, these robotic placement printers are limited to reinforcement fibers with large lengths and geometries, fiber orientation controls limited to the X-Y plane, and the dispensing being limited to the trajectory of the toolpath. This results in reduced physical strength, stiffness, and thermal properties of the part when the trajectory of the toolpath, and therefore alignment of reinforcing fibers, are determined by the geometry requirements of the part instead of the ideal alignment of fibers for these properties.

SUMMARY OF THE INVENTION

Aspects of this invention addresses these shortcomings by utilizing a 3D printing platform that constructs a required geometry and aligns anisotropic inclusions in any orientation at any number of discrete volumetric sections as two independent processes. The techniques and supporting systems utilize structural, thermal, and geometry-based analysis, novel inclusion alignment computation, and print preparation methods along with unique 3D printers to produce composite material parts that meet demanding geometric needs as well as enhanced structural and thermal requirements. The process introduces inclusions (e.g., fibers or other particles) in any three-dimensional (3D) vector at any data volumetric pixel (referred to herein as a "daxel") of a print being produced by 3D printers adapted to implement this process.

In a first aspect of the invention, a method for producing machine-readable instructions for manufacturing an object having anisotropic inclusions includes receiving, from an object design application, a specification file describing the object as a 3D model and, based at least in part on the specifications, defining inclusion alignment vectors, each inclusion alignment vector being associated with a daxel of the object and based at least in part on the specification file. In some cases, a set of optimal inclusion alignment vectors may be achieved. In some implementations the alignment vectors are further defined by a mathematically defined alignment pattern or, in other cases, a geometrically defined alignment algorithm across at least a portion of the object.

The 3D model is segmented into layer slices and daxels within each layer slice having substantially similar alignment vectors are grouped together. The groupings are then subdivided into slices, from which machine instructions are generated, directing a 3D printer to manufacture the object having anisotropic inclusions aligned according to the grouped alignment vectors.

In some embodiments, results from a finite element analysis are also used such that the optimal inclusion alignment vectors are also based on the finite element analysis results. In some instances, a predefined, layer-specific set of alignment vectors can also be used to derive the inclusion alignment vectors. In cases in which an optimal set of vectors is desired, the steps can be repeated until a set of object characteristics satisfy the build parameters, which, in some cases, may be defined by one or more threshold parameters. In some embodiments, grouping each daxel within each slice having substantially similar alignment vectors is done by grouping areas having alignment angles within a defined range.

In certain cases, a set of stress values is stored for each daxel by, for example, calculating a set of principal stress vectors for each daxel and selecting one of the principal stress vectors having the greatest magnitude as optimal inclusion alignment angle of a long axis of the anisotropic inclusion. In such instances, the magnitude of the selected principal stress value for a subset of the daxels can be compared to a threshold magnitude value, and any daxel(s) not meeting the threshold value may be disregarded.

For some objects, one or more support structures are identified within the object and each support structure is assigned to a subdivided slice, which is assigned a misaligned angle relative to (e.g., tangent to) the surface with which the support structures connect, thus intentionally introducing a weak point in the object. In other instances, polymerization levels can be varied at daxels within the three-dimensional model, thus creating areas within the model having different material properties, such as one or more interlocking sections spanning object layers. In some cases, the subdivided slices of multiple objects which have substantially similar alignment vectors can be combined, based on relative position on a build area.

In another aspect, a system for producing machine-readable instructions for manufacturing an object having anisotropic inclusions includes one or more computer processors programmed to perform machine-readable computer instructions to receive, from an object design application, a specification file describing the object as a three-dimensional model and, based at least in part on the specifications, define inclusion alignment vectors, each inclusion alignment vector being associated with a daxel of the object and based at least in part on the specification file. In some cases, a set of optimal inclusion alignment vectors may be achieved. The three-dimensional model is segmented into layer slices and daxels within each layer slice having substantially similar alignment vectors are grouped together. The groupings are then subdivided into slices, from which machine instructions are generated, directing a three-dimensional printer to manufacture the object having anisotropic inclusions aligned according to the grouped alignment vectors.

In some embodiments, the computer instructions instruct the processors to accept results from a finite element analysis, which may then be used to determine the inclusion alignment vectors. In some implementations, the processors are further instructed to receive a predefined, layer-specific set of alignment vectors on which the optimal inclusion alignment vectors are further based. The process may be repeated until a set of optimal inclusion vectors are reached to create a set of object characteristics satisfy build parameters for the object, which may be defined by one or more threshold values. In some embodiments, the execution of the instructions groups each daxel within each slice having substantially similar alignment vectors by grouping areas having alignment angles within a defined range.

In certain cases, a set of stress values is stored for each daxel by, for example, calculating a set of principal stress vectors for each daxel and selecting one of the principal stress vectors having the greatest magnitude as optimal inclusion alignment angle of a long axis of the anisotropic inclusion. In such instances, the magnitude of the selected principal stress value for a subset of the daxels can be compared to a threshold magnitude value, and any daxel(s) not meeting the threshold value may be disregarded.

For some objects, one or more support structures are identified within the object and each support structure is assigned to a subdivided slice, which is assigned a misaligned angle relative to (e.g., tangent to) the surface with which the support structures connect, thus intentionally introducing a weak point in the object. In other instances, polymerization levels can be varied at daxels within the three-dimensional model, thus creating areas within the model having different material properties, such as one or more interlocking sections spanning object layers. In some cases, the subdivided slices of multiple objects which have substantially similar alignment vectors can be combined, based on relative position on a build area.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
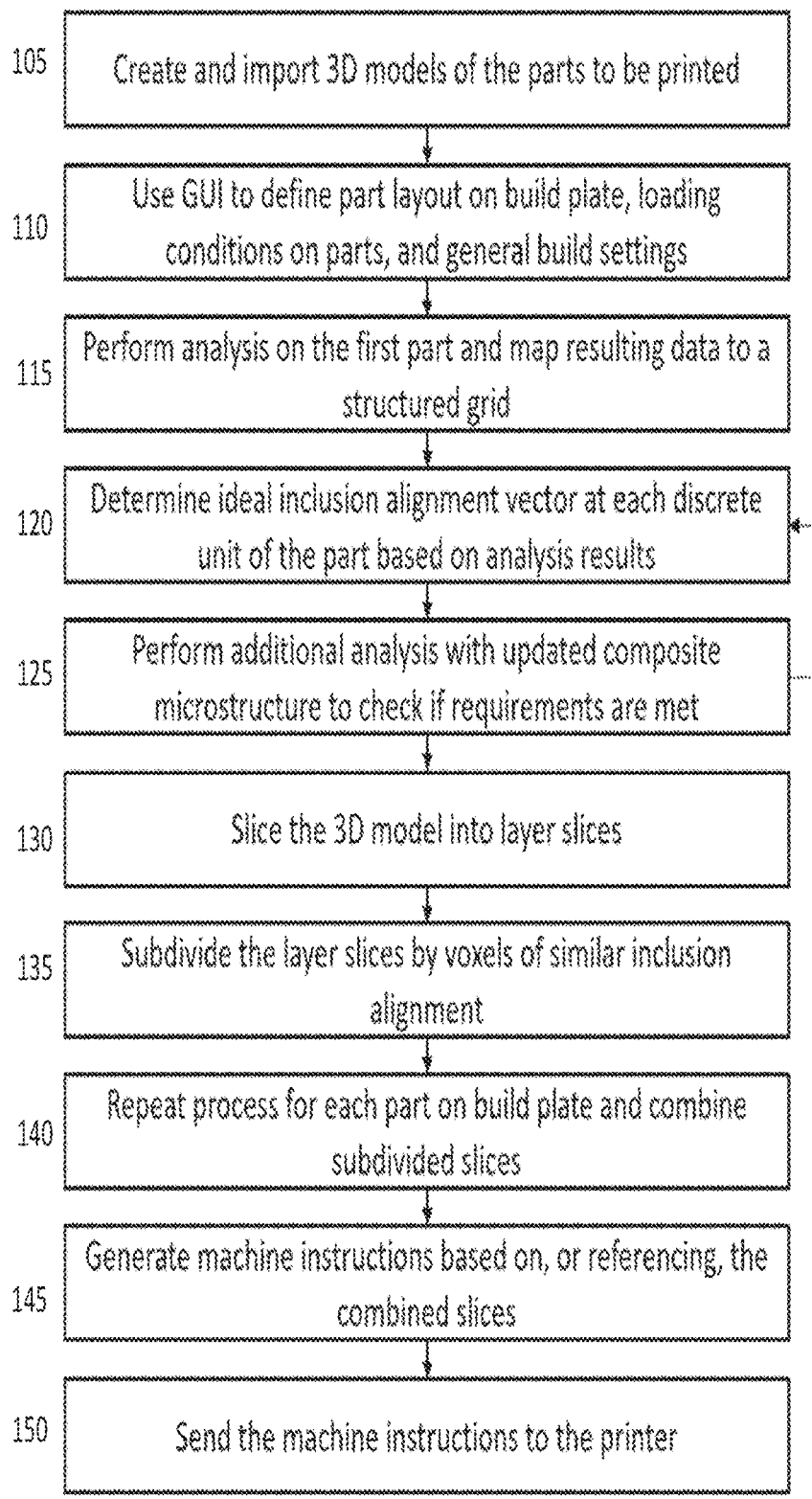
FIG. 1 is a flowchart illustrating a process flow for microstructure design and print setup in accordance with various embodiments of the invention.

In various embodiments, the invention operates as shown in FIG. 1. A three-dimensional (3D) model of the part or object to be produced is prepared using commercially-available modeling software and is saved as a geometry file (such as a STEP or IGES file) and/or as a triangle mesh file (such as a STL file) (Step 105). In embodiments utilizing finite element analysis (FEA) to create the alignment parameters for the object, the geometry file is used as input into an FEA process to assess the part according to one or more boundary conditions and one or more structural or thermal loading conditions determined by the operator to simulate various use cases. The loading conditions are applied as they would to analyze the part, and the material selected may be a homogenized isotropic material that represents the composite material to be printed with purely random alignment. The mesh size may be finer than usual (small element size selected), as this provides more data for later on in the process. As an example, a 50 mm cube may be assigned an element size of 500 µm, resulting in approximately four million nodes once meshed, each providing a data point for the next steps of analysis. For a structural analysis, the data is then exported by solving for components of the stress vector at the nodes and exporting as a text file. In other examples, the alignment parameters may comprise layer-specific vectors, mathematically defined vectors throughout the volume of the object, or results from various geometry-surface-topology-algorithms.

In other embodiments where structural or thermal analysis is not used, various methods of receiving inclusion alignment instructions can be utilized. A uniform alignment orientation may be set for the entire print or for each layer individually, such as a ply-style alignment scheme where the inclusions within each layer are uniformly aligned to a vector in the XY plane that rotates a set amount for each subsequent layer. In some embodiments, a mathematical formula can be used to describe inclusion alignment based on its position in 3D cartesian space. These mathematical descriptions may be used to form ordered reinforcing inclusion networks that are intended to give mechanical benefit in all directions equally, regardless of geometry or use case. In other embodiments, an analysis of the provided geometry file or triangle mesh can be performed based on algorithms to predict optimal inclusion alignment for general use cases of that specific geometry. These algorithms may include analysis of factors including, but not limited to: topology, surface curvature, meshing, and defined and/or recognized features.

Still referring to FIG. 1, a software-implemented application and a graphical user interface (GUI) are then used to set up a print job (Step 110). The print job may include defining part properties (including selecting the STL and text files for data already created), moving, rotating, and/or scaling part instances on the build plate of the printer as necessary, creating support structures, and defining build properties such as layer thickness, material type and processing settings, alignment bin size, and exposure settings.

Once completed, the information collected from the GUI is compiled and used as the input to the subsequent alignment processes.

The alignment and print procedure processes perform the tasks of analyzing the received analysis results (mechanical, geometry-based, or other) to determine anisotropic inclusion alignment as well as analyzing the imported geometry to determine printing procedures. These two processes can be performed in parallel or sequentially, with the results combined to create final print instruction files. The ability to perform the inclusion alignment and bulk print setup processes independently of each other allows the two considerations to not affect the material property benefits achievable by the other.

Determining inclusion alignment begins with processing the received analysis results. The point cloud of nodal data resulting from the analysis is rotated as needed and mapped to a structured grid (Step 115). The structured grid has the size and shape of a bounding box of a nodal data point cloud, with its grid spacing determined by a user-defined value of greater size than the average node spacing within the point cloud, generally 1.5 to 3 times the average node spacing. The grid spacing defines the size of one data volumetric pixel (daxel) which contains one or more volumetric pixels (voxels) which will have identical inclusion alignment. Voxel size is determined by the physical print resolution, while daxel size can be adjusted for each print based on the desired balance of print setup time and a targeted thermal or structural property.

In order to map the nodal data point cloud to this grid, a 3D interpolation is performed at each grid point. In one method, a trilinear interpolation is performed on these points of interest. The data point with the nearest position in each octant surrounding the point of interest is selected, and Delaunay triangulation and barycentric interpolation are performed on these eight reference points to determine the structural or thermal data at the desired grid point. This is repeated for each gridpoint to complete the structured data set. Other methods of 3D interpolation that may be used for each grid point include nearest-neighbor interpolation, natural neighbor interpolation, and tricubic interpolation. Any of these can be used in this process depending on the desired balance of interpolation accuracy and computation cost. If a gridpoint corresponds to a daxel that is fully outside of the print, it is flagged as an empty daxel and does not contain a data point. If a gridpoint corresponds to a daxel that is on the surface of the print, an alternative interpolation method, such as nearest-neighbor interpolation, may be performed for that specific gridpoint.

Various physical properties of the composite material can be improved or manipulated via the alignment of anisotropic inclusions, thus creating a desired property that is unique from the surrounding matrix. In one embodiment, to improve structural characteristics of parts experiencing high mechanical loads, an inclusion with high tensile strength and stiffness can be aligned in the direction of principal stress. In another embodiment, to improve thermal stability of parts at high temperatures, alignment of an inclusion with a low coefficient of thermal expansion and high thermal conductivity along the principal thermal stress direction improves thermomechanical performance and facilitates heat transfer in the direction of alignment. In another embodiments such as the production of composite antennas, waveguides and other electromagnetic applications, inclusions with a high dielectric constant can be oriented relative to the anticipated field direction to tune dielectric constants. In another embodiment, to tune optical properties, inclusions with an ability to scatter, absorb, or reflect photons can be oriented at voxels near the part surface to create regions of tunable coloring or brightness. Such tunable coloring can be used for aesthetic texturing as well as for embedding identification codes (for optical scanning, for example) or branding into the surface. Similarly, this method may be used to selectively tune the absorbance, transmittance, or reflectance of electromagnetic waves. For example, a patterned alignment pattern may be used to create super high frequency (GHz radiowaves) scanning codes for embedded tagging, identification, and tracking applications.

The interpolated structural, thermal, or geometry data at each daxel is then used to determine the anisotropic inclusion alignment for that daxel. In one embodiment which prioritizes increasing structural properties of the printed part, the six component stress values held in the daxel are used to solve for three principal stress vectors. Of the three, the one with the greatest magnitude (positive or negative) is selected as the orientation of the long axis of the anisotropic inclusion. If this magnitude is under a certain threshold or meets other criteria of exemption, the daxel is flagged to be ignored. This allows for a more efficient printing process without affecting mechanical benefits due to the stress being low enough to ignore in that area. Whether this method or another is used, the resulting vector is converted from a cartesian to spherical coordinate system and represented as a phi angle (vertical rotation) and theta angle (horizontal).

In some embodiments, FEA can be performed again using the inclusion alignments determined by the last step. This may be done using either homogenized anisotropic material properties and a material orientation defined at each daxel, or a multi-scale analysis with reinforcing particles modeled within each voxel. The results of this analysis can then be used to determine an updated set of ideal inclusion alignments using the same process described above (Step 120). This cycle can be repeated a set number of times or until convergence on an optimized solution for a specific property is achieved (Step 125). For instance, the cycle can be instructed to repeat until the positive difference between the theoretical maximum von mises stress of the current and previous iteration of analysis is smaller than a set threshold. This step is also important to provide a verification that a theoretical structural or thermal property improvement was provided to the part with the given microstructure design.

In some embodiments, a subprocess may be implemented wherein the imported STL file containing a triangle mesh is used to gather geometry data and create a large number of layer slices (Step 130), approximately 4 to 100 layers per mm of height in most DLP or SLA systems. The heights at which to define the sliced contours are determined by either an operator-defined layer thickness or the vertical distance that the build plate will move during one frame of a continuous polymerization process (or similar material consolidation method). In some cases, these layers may be defined on a shell or 3D contour rather than a flat surface of uniform height. For each layer, a set of points intersecting the layer plane are selected and connected to create a set of contours, resulting in the layer slice. In most reservoir-based printers, a set of images of these filled contours for each layer is sent to the printer to be projected or rastered onto the build plate during printing. Embodiments of this invention provide for an additional step prior to exporting images, namely subdividing the layer slices into images of similar inclusion alignment (Step 135).

Figure 2:
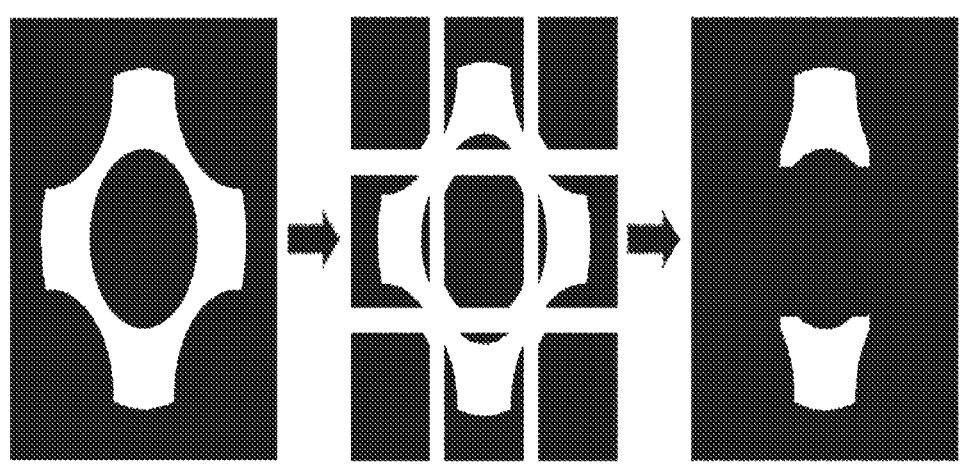
FIG. 2 provides examples of a layer slice being chopped into smaller images representing areas of similar inclusion alignment and reassembled into subdivided slices based on inclusion alignment in accordance with various embodiments of the invention.

The subdivision process begins by assigning each daxel to bins of set inclusion alignments. Based on the alignment bin size selected by the user, the phi and theta angles representing the alignment of inclusions within each daxel is rounded to the nearest used angle. As an example, a bin size of 15 degrees may be selected, meaning that all theta or phi angles will be individually rounded up or down to one of 12 values between zero and 180 degrees (0, 15, 30, etc.). As this process is being applied to both horizontal and vertical alignment, there are 133 unique alignments in this example (theta rotation does not affect orientation at full vertical alignment of phi=0 degrees). If a daxel has been flagged to be ignored due to having low stress or priority in that area, it can be either assigned to an appropriate neighboring daxel's alignment bin or assigned to a bin representing all randomly aligned daxels. Each layer slice is then chopped into smaller sections with the size of the daxels solved for earlier in the process. The binned alignment data is then compared to these sections based on position, with the vertical position of the slices corresponding to layer number and the layer thickness. As a result, each section is assigned a theta and phi angle for inclusion alignment within that section. For every inclusion alignment combination in a layer, a new slice is created by combining the contours of the chopped sections with that inclusion alignment as illustrated in FIG. 2. Each resulting subdivided slice defines the geometry of one inclusion alignment within one layer.

In some embodiment, support structures may be included in the slices and assigned to a subdivided slice that is identified as not having an alignment (resulting in mostly random alignment). Examples of a support structure may include a scaffold or beam structure, handle, tab, or other element of the printed part that is not critical to the function of the part, but may ease in manufacturing, handling, installation or placement. If desired by the operator, the tips of the support structures that come in contact with the part can be designed to have an inclusion alignment tangent to the surface of the part, producing a weaker connection that can be broken off more easily. In addition or alternatively, voxels from the support structure that are in contact with the part can be set to be over-polymerized to make them more brittle and easier to snap off. This may be done by, for example, increasing the exposure time or brightness of specific pixels to be displayed in a DLP system, or by increasing laser power, decreasing raster speed, or increasing number of laser passes in a SLA or sintering system. Controlling the level of polymerization, sintering, or other material consolidation method through changing overall power, overall or local exposure time, or localized changing of projected pixel brightness (image greyscaling) can also be used to design changes to material properties such as stiffness and strength in the internal and surface part space. In addition, controlling the amount of energy per voxel can enable printing of interlocking patterns that can increase bonding strength between layers, or enable texturing of parts, such as the brick and mortar print style described further below.

Referring again to FIG. 1, the process of analyzing alignment and slicing the parts is repeated for each unique part to be printed together on one build plate (Step 140). Any number of copies of a part can be scaled, moved, and rotated around the Z-axis (axis normal to the build plate) without having to perform a subsequent analysis. When two or more parts have subdivided slices with identical layer definitions and inclusion alignments, the subdivided slices can be combined based on their relative position on the build plate, creating the final set of slices. In alternative methods, this step may occur earlier in the overall process, or be removed altogether in the case of the binning and subdivision steps being performed on an entire build plate simultaneously rather than its individual components. Each resulting combined slice defines the geometry of one inclusion alignment within one layer of all parts on the build plate.

Machine instructions, often in the form of g-code, are generated based on the combined slices (Step 145). These instructions vary for different styles of printing, but include instructions to control the build plate's vertical movement and other general machine functions; control of the polymerization, sintering, or other means of producing consolidation; and control of the method of anisotropic inclusion alignment. The machine instructions and any required accompanying data, such as slice images files, can be packaged in an archived file (such as a ZIP file) and sent to the 3D printer controller (Step 150). In one embodiment, a DLP 3D printer, a printer control program sends g-code commands via serial communication to the printer control board and displays images on the UV projector according to g-code commands.

Figure 3:
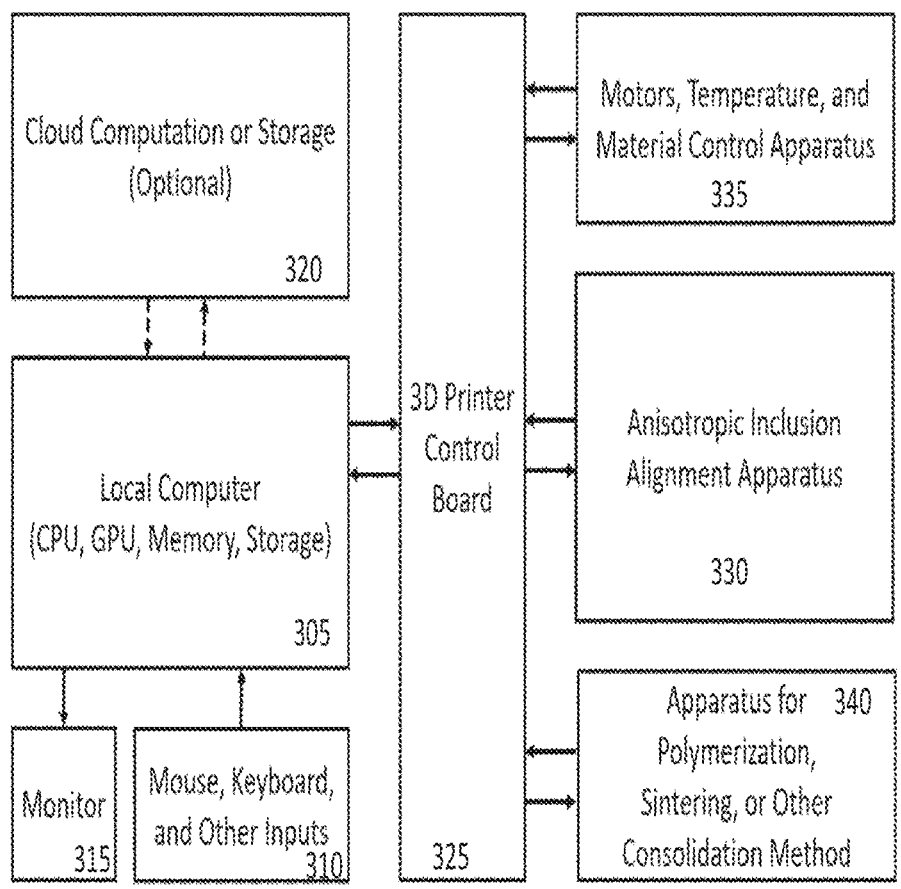
FIG. 3 is a schematic of a system used to implement the techniques described herein in accordance with various embodiments of the invention.

In some embodiments, the technique is implemented using software instructions that operate on and interact with a number of operational components, as illustrated in FIG. 3. As input, a user defines the build plate to be printed within an application, GUI or terminal command line on a local computer 305 or on a web portal through a browser running on the local computer 305 using input devices such as a mouse or trackpad 310 and tracks the commands or movements on a monitor 315 displaying the output from the computer 305. The computation required in the process described above can be performed using the local computer's hardware or can be outsourced to a remote machine using a cloud computing service 320.

The print files or individual print instructions are then sent to a 3D printer control board 325, which interacts with the printer components, including an anisotropic inclusion alignment apparatus 330. This includes any device, or component of a device, which actively or passively aligns anisotropic inclusions within a fluid, molten plastic, or powder matrix, including devices using electric fields, magnetic fields, ultrasound, vibration, and/or shearing to align the anisotropic inclusions. Additional printer components may include motors, control apparatus for temperature 335 and material handling, and an apparatus 340 to consolidate the matrix material through polymerization, sintering, or other method.

Figure 4:
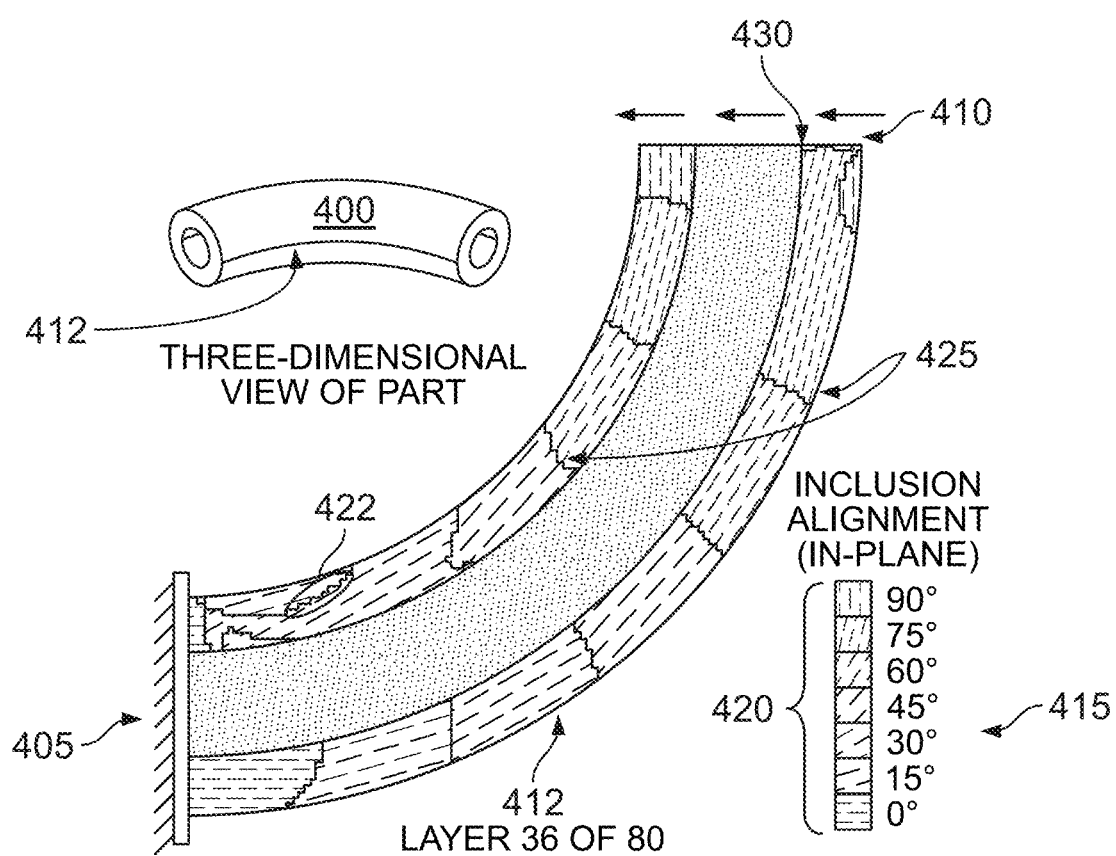
FIG. 4 illustrates an example object produced with inclusions aligned in accordance with various embodiments of the invention.

FIG. 4 illustrates one example analysis performed using a bent tube 400 geometry. In this example, a static boundary condition is set on one end of the tube 405 and a transverse load is applied to the opposite end 410 to simulate the tube being bent further inward. Part and print settings are provided, including setting the alignment bin tolerance to +/−7.5 degrees in both the theta and phi directions of 3D space. The steps described above can be performed by the computer 310, resulting in a print file being created containing the machine instructions and images required by the 3D printer.

FIG. 4 also shows a graphical summary of the analysis, including the geometry used, loading conditions, and anisotropic inclusion alignment results for one layer 412 towards the middle of the print. The different hashed groupings 415 correspond to one of the seven anisotropic inclusion alignment bins 420 between zero and ninety degrees. As expected, the anisotropic inclusions are aligned with their long axis tangent to the curve of the tube. In this image, only theta (in-plane) alignment is shown.

Each shaded square within the shown layer corresponds to a daxel (determining alignment resolution), while each pixel within the shown layer corresponds to a voxel (determining print resolution). The relative daxel size can be seen by the aliasing 422 between alignment bin boundaries 425 while the relative voxel size can be seen by the slight aliasing 430 on the edge of the part.

Figure 5:
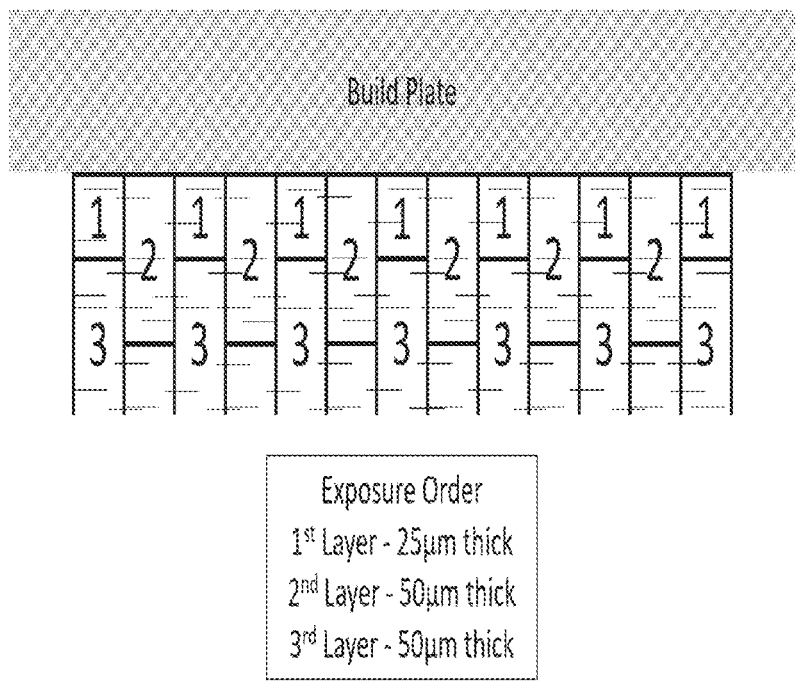
FIG. 5 illustrates a technique for selectively polymerizing specific voxel groups at each layer in accordance with various embodiments of the invention.

FIG. 5 shows an exemplary method to combat a potential material weakness at the interface between sequential printed layers seen in many 3D printed parts, including those made with DLP/SLA style printers. This weakness is derived from the printing process in which a previous layer is cured, such as with UV light, creating a graded cross-linked network within that printed layer in which the layer has the highest cross-linking density on the side of the curing source (light or other) and the lowest cross-linking density on the side nearest the build plate. When a subsequent layer is printed, a similarly oriented cross-link gradient is created juxtaposing the high cross-linking of one side with the low cross-linking of the other side. There are at least two principle weaknesses that this process introduces at the interface: the creation of a sharp jump in stiffness and ductility at the layer interface due to the cross-linking discontinuity, and little polymer cross-linking and entanglement between printed layers due to the high cross-linking of the layer on the side of the curing source. The combination of these and other similar phenomena lead to a weak and brittle interface that can fail at lower stress than the bulk matrix within the printed layers.

To overcome this structure-processing-performance limitation in many styles of 3D printing, including SLA-DLP printing, the printed interfaces between subsequent layers are castellated, as shown in FIG. 5. Castellation of the interface increases the surface area between layers, which improves the cohesiveness between printed layers. In this scheme, for a crack to perpetuate it would either need to traverse the castellated interface, requiring an increased fracture energy due to the higher surface area, or would need to propagate through the center of bulk polymerized voxels requiring a fracture energy more consistent with bulk polymerized polymer. The castellation scheme provides improvements to the Z-axis properties of printed parts, closing the mechanical gap between the X-Y directions of printed parts with the Z direction. These properties include enhanced strengths including tensile, shear, and flexural, as well as increases in ductility and toughness.

To achieve this design, the triangle mesh file is sliced with a layer thickness half of the nominal layer height, and then subdivided into two complementing sets of images with a set patterned overlays (such as checkerboard geometries). As the printing process progresses, each half-layer increase in layer height polymerizes the corresponding image from one of the two sets in alternating fashion. Throughout the process, inclusion alignment can be utilized, in which case the orientation can be locked in the XY plane. The result is a part having all sections printed at nominal layer height, but shifted by a half-layer height with neighboring voxels.

Figure 6:
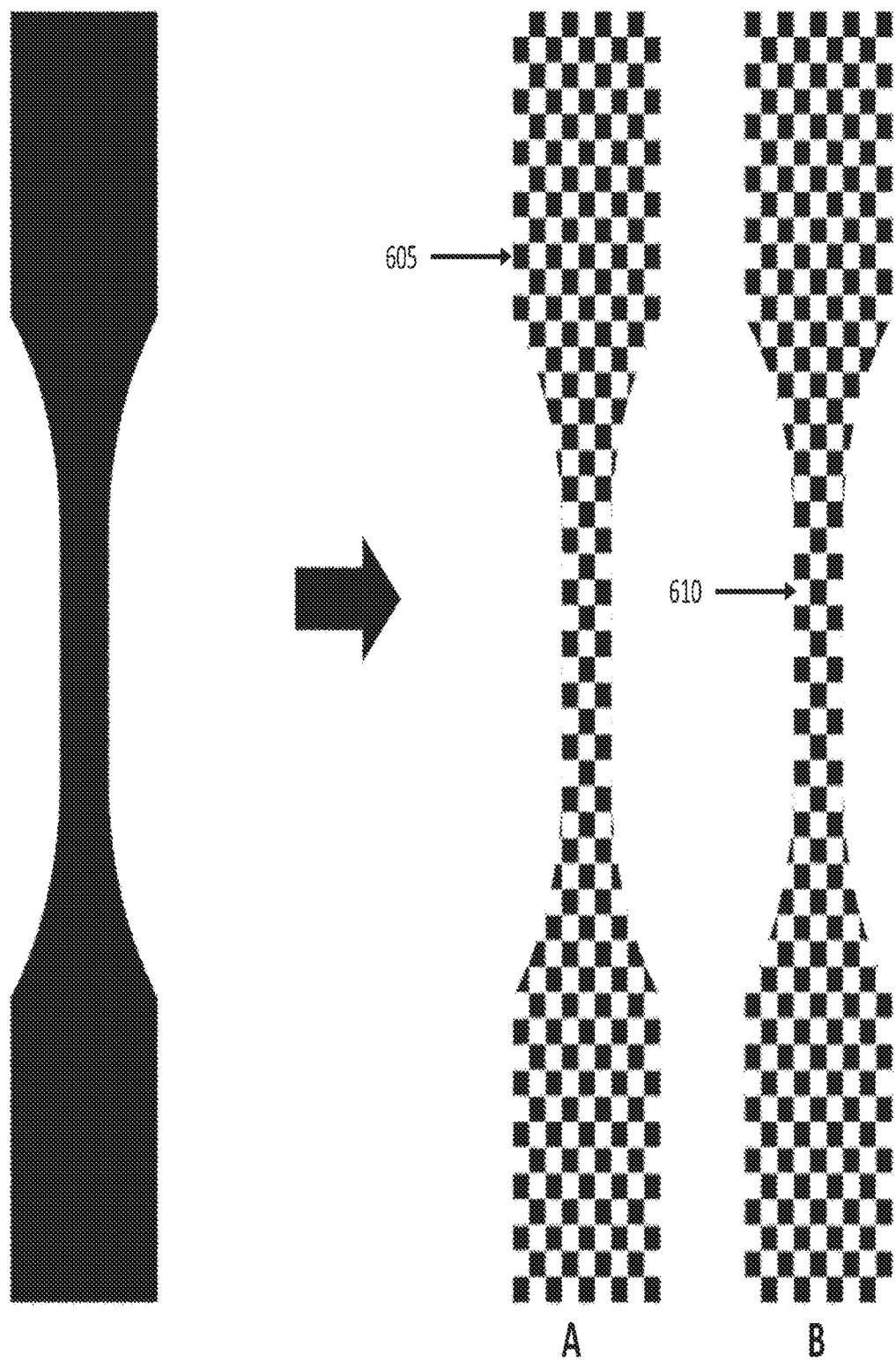
FIG. 6 illustrates an example of a slice division pattern that may be used alongside a castellation technique.

Various castellation schemes and geometries may be used including checkerboard geometries. In this example, the black squares of a checkerboard in layer 1 are printed first, followed by the white squares of a checkerboard in layer 2, followed again by the black squares in layer 3, and so-on. FIG. 6 shows a layer slice having an overlayed checkerboard pattern 605 and then that patterned image being inverted 610, representing the two subsequent layers using this method (A and B). This scheme can be referred to as a square checkerboard with ABAB stacking. In addition, more complex printing patterns may be used such as checkerboards with ABCDABCD stacking or triangular patterns with ABC stacking, or rhombus patterns with ABAB stacking, or more complex patterns such as basket-weaves with ABAB or ABCABC, or other stacking.

In some embodiments, the depth of the curing to proceed is greater than twice the z-resolution height of the printing platform. For example, in an ABAB stacking scheme, the z-height resolution of the printing device would be approximately half of the depth of cure of the polymerization process. As mentioned herein, controlling the polymerization power can achieve this variable cure thickness requirement.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including, by way of example, semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for additive manufacturing of an object, the method comprising:
receiving, at a computer processor, a specification file describing the object as a three-dimensional model, the three-dimensional model comprising a plurality of layer slices of the object;
defining, by the computer processor, a three-dimensional geometric interface between layer slices that provides for a three-dimensional patterned, non-planar interface between adjacent layer slices; and
sequentially printing the layer slices including the non-planar interfaces using an additive manufacturing apparatus thereby formulating the object.

2. The method of claim 1 wherein at least a subset of adjacent layer slices are subdivided into complementing sets of images having patterned extruded overlays.

3. The method of claim 2 wherein the subdivided sets of images are defined as having a fractional layer thickness of a nominal layer height.

4. The method of claim 3 wherein the fractional layer thickness is one of half of the nominal layer height, one third of the nominal layer height or one quarter of the nominal layer height.

5. The method of claim 4 further comprising polymerizing each fractional layer in alternating fashion.

6. The method of claim 2 wherein the patterned extruded overlay comprises one of a rhomboid or a triangular pattern.

7. The method of claim 2 wherein the patterned overlay comprises an alternating stacking pattern such that the pattern repeats every $n^{th}$ fractional layer, where n is a whole number.

8. The method of claim 2 wherein the patterned overlay comprises an alternating stacking pattern such that the pattern repeats at most every third fractional layer.

9. The method of claim 1 wherein the three-dimensional patterned non-planar interface comprises a checkerboard configuration comprising interdigitated extruded squares.

10. The method of claim 9 wherein the checkerboard configuration comprises an array of extruded squares having substantially consistent dimensions along an x axis and y axis and having alternating dimensions along a z axis.

11. The method of claim 1 further comprising defining a plurality of optimal inclusion alignment vectors for each fractional layer, each inclusion alignment vector being associated with a daxel of the object;
grouping daxels within each fractional layer having substantially similar alignment vectors;
combining the grouped daxels into subdivided fractional layers; and
generating machine instructions directing a three-dimensional printer to manufacture the object such that the anisotropic inclusions are aligned according to the grouped alignment vectors.

12. The method of claim 11 wherein the anisotropic inclusions are aligned within an X-Y plane such that the anisotropic inclusions cross at least one boundary of adjacent layer slices.

13. A system for additive manufacturing of an object, the system comprising:
one or more computer processors programmed to perform operations to:
receive a specification file describing the object as a three-dimensional model, the three-dimensional model comprising a plurality of layer slices of the object;
define a three-dimensional geometric interface between layer slices that provides for a three-dimensional patterned, non-planar interface between adjacent layer slices; and
sequentially print the layer slices using an additive manufacturing apparatus thereby formulating the object.

14. The system of claim 13 wherein at least a subset of adjacent layer slices are subdivided into complementing sets of images having patterned extruded overlays.

15. The system of claim 14 wherein the subdivided sets of images are defined as having a fractional layer thickness of a nominal layer height.

16. The system of claim 15 wherein the fractional layer thickness is one of half of the nominal layer height, one third of the nominal layer height or one quarter of the nominal layer height.

17. The system of claim 16 wherein the computer processors are further programmed to perform operations to polymerize each fractional layer in alternating fashion.

18. The system of claim 14 wherein the patterned extruded overlay comprises one of a rhomboid or a triangular pattern.

19. The system of claim 14 wherein the patterned overlay comprises an alternating stacking pattern such that the pattern repeats every $n^{th}$ fractional layer, where n is a whole number.

20. The system of claim 14 wherein the patterned overlay comprises an alternating stacking pattern such that the pattern repeats at most every third fractional layer.

21. The system of claim 13 wherein the three-dimensional patterned non-planar interface comprises a checkerboard configuration comprising interdigitated extruded squares.

22. The system of claim 21 wherein the checkerboard configuration comprises an array of extruded squares having substantially consistent dimensions along an x axis and y axis and having alternating dimensions along a z axis.

23. The system of claim 13 wherein the computer processors are further programmed to:
define a plurality of optimal inclusion alignment vectors for each fractional layer, each inclusion alignment vector being associated with a daxel of the object;
group daxels within each fractional layer having substantially similar alignment vectors;
combine the grouped daxels into subdivided fractional layers; and
generate machine instructions directing a three-dimensional printer to manufacture the object such that the anisotropic inclusions are aligned according to the grouped alignment vectors.

24. The system of claim 23 wherein the operations direct the anisotropic inclusions to be aligned within an X-Y plane such that the anisotropic inclusions cross at least one boundary of adjacent layer slices.

* * * * *